Figure 5:
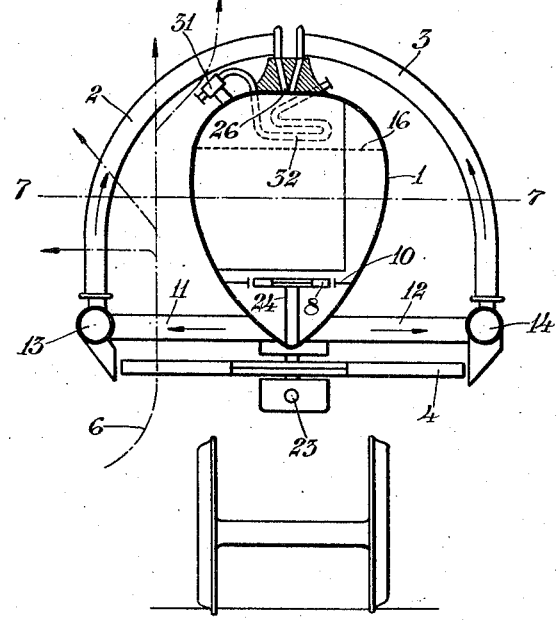

Feb. 9, 1926. 1,572,153
B. LJUNGSTRÖM ET AL
CONDENSER PLANT FOR LOCOMOTIVES
Filed August 23, 1923 5 Sheets-Sheet 1
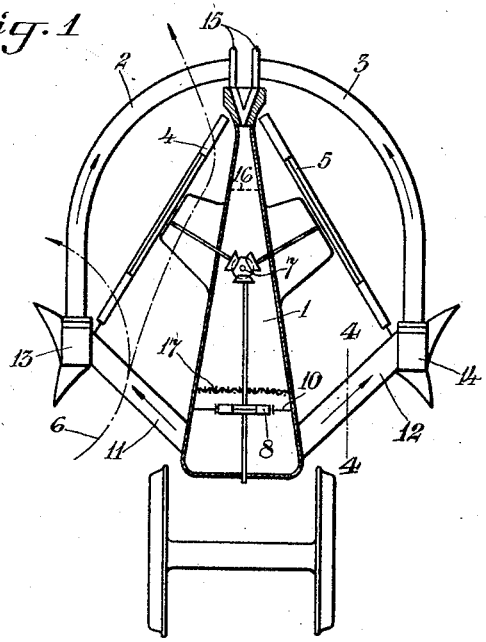
Fig. 1
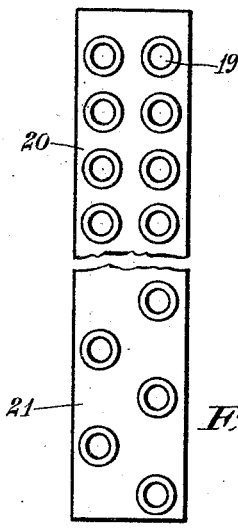
Fig. 3
Fig. 3a.
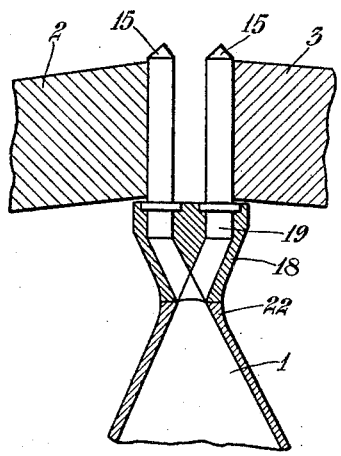
Fig. 2
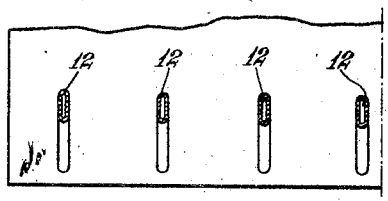
Fig. 4
Inventors
B. Ljungström
E. O. Eriksson
F. Ljungström
By Marks & Clerk
Attys.

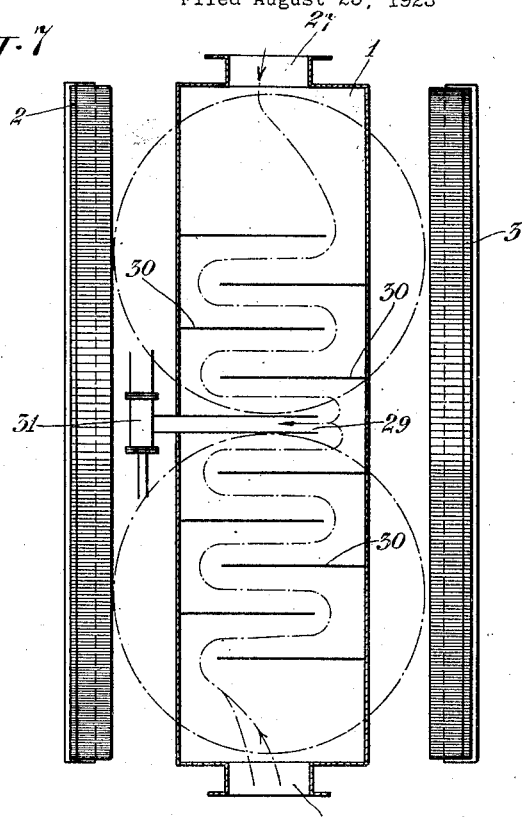
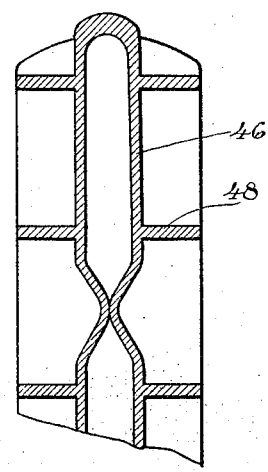
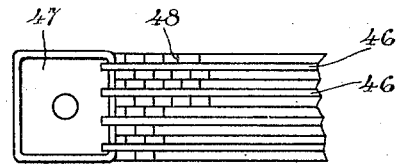
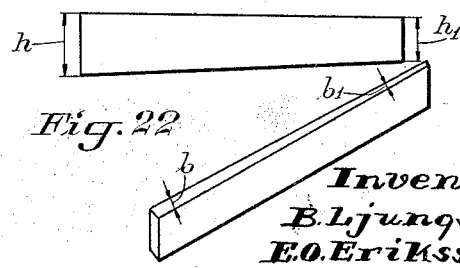

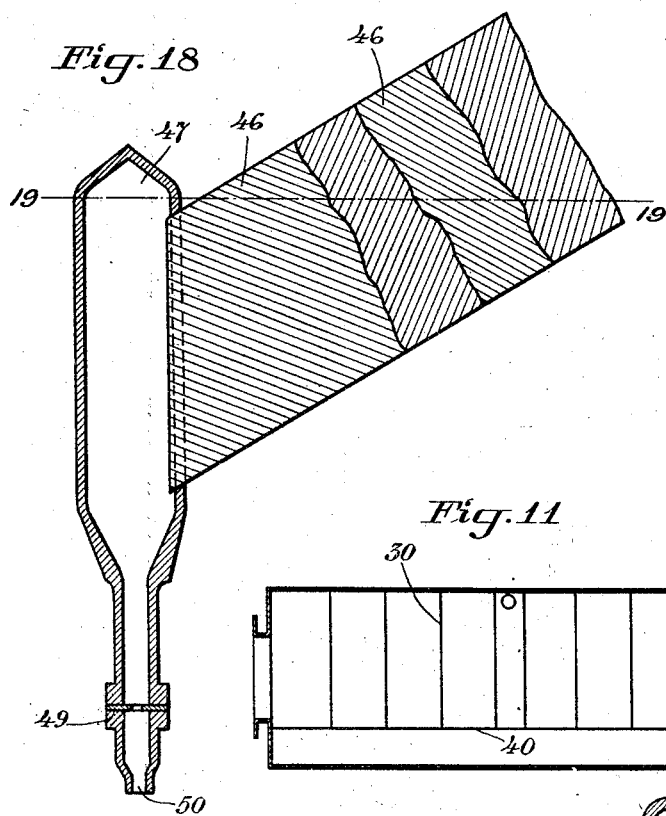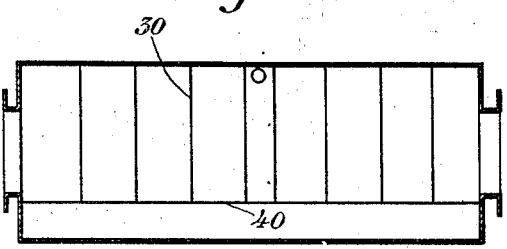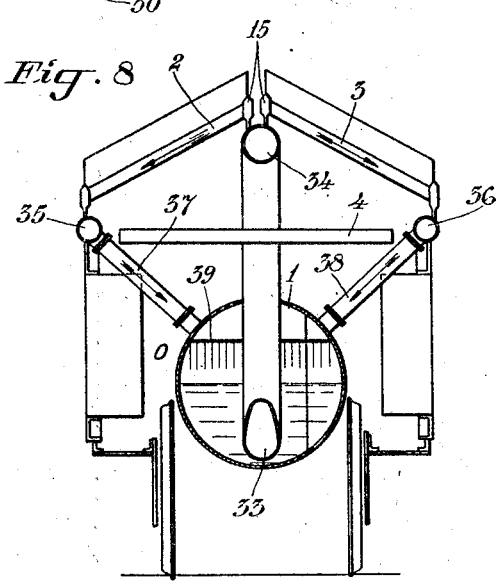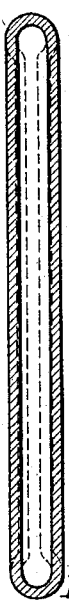

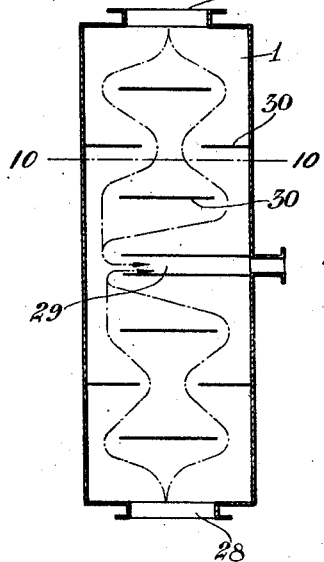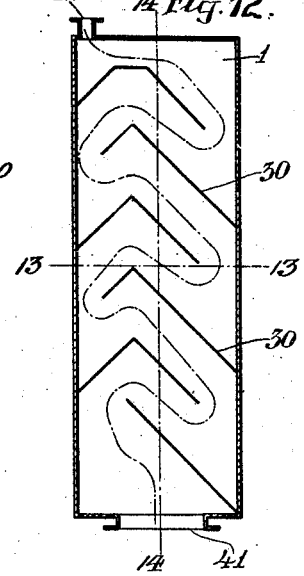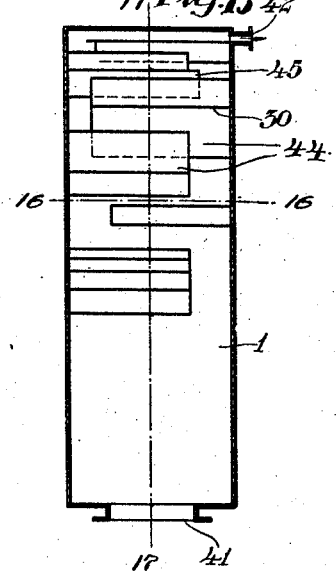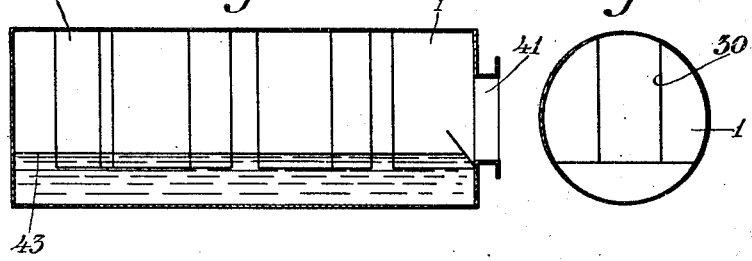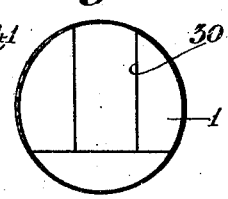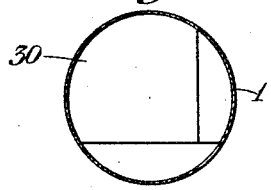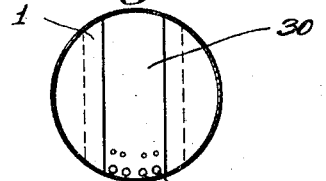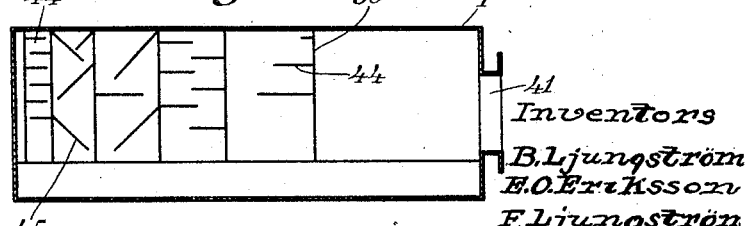

Patented Feb. 9, 1926.

1,572,153

UNITED STATES PATENT OFFICE.

BIRGER LJUNGSTRÖM, OF STOCKHOLM, AND ERIK OTTO ERIKSSON AND FREDRIK LJUNGSTRÖM, OF LIDINGO-BREVIK, SWEDEN, ASSIGNORS TO AKTIEBOLAGET LJUNGSTRÖM ÅNGTURBIN, OF STOCKHOLM, SWEDEN, A CORPORATION.

CONDENSER PLANT FOR LOCOMOTIVES.

Application filed August 23, 1923. Serial No. 659,007.

*To all whom it may concern:*

Be it known that we, BIRGER LJUNGSTRÖM, ERIK OTTO ERIKSSON, and FREDRIK LJUNGSTRÖM, subjects of the King of Sweden, residing at, respectively, Narvavagen 21, Stockholm, Sweden, Ormbunken, Lidingo-Brevik, Sweden, and Lidingo-Brevik, Sweden, have invented certain new and useful Improvements in Condenser Plants for Locomotives, of which the following is a specification.

In condensers for locomotives it has previously been suggested to conduct the waste steam from the driving machinery into a receptacle having the form of an ejector or mixing condenser and to let the necessary cooling water pass through an air-cooled recooling device to circulate through the whole condenser plant. It has also previously been suggested to give the condenser a lengthened form counted in the longitudinal direction of the locomotive and to place it below the recooling device which has consisted of pipes or corresponding elements or similar parts, the air necessary for cooling having been forced on by fans placed between the condenser and the air-cooled recooling device. It has further been suggested to make these fans of the screw type, to place them alongside one another, and to make them work in one or more diaphragms which may form an angle with one another. The fans have been arranged in one or more rows extending in the longitudinal direction of the condenser and have sucked the cooling air from below and forced it through the recooling device essentially in a direction upwards or obliquely upwards. Further it is known that the recooling device be composed of flattened pipes extending in the transverse direction of the condenser plant and being arranged alongside one another and provided with flanges, said pipes, in groups of four, five or six elements, having been collected in common collecting chambers communicating with pipes extending in the longitudinal direction of the condenser plant and communicating with the condenser by means of outlet and inlet pipes. In these condenser structures the cooling water has been pumped from the bottom of the condenser directly into the top of the recooling device by means of only one centrifugal pump. From the top of the recooling device which has been situated right above the condenser the water has passed along the portions of the recooling device situated at the sides of the condenser whilst being cooled and has then been introduced into the mixing condenser above a diaphragm arranged therein. A condenser structure of this kind has comprised a cylindrical condenser which has been arranged below the recooling device in such a way, that the space at disposal within the limits of the loading gauge could not be utilized satisfactorily. A locomotive being of course also limited with regard to its length, said length cannot be increased more than up to a certain limit to find room for necessary parts, and therefore the space limited by the loading gauge vertically and laterally must be utilized to the utmost. For this purpose it has been suggested to give the elements of the recooling device a bent shape or to make them up of parts extending angularly to one another so that the elements run close to the upper contour of the loading gauge.

The present invention refers to locomotives in which the air necessary for cooling is forced onwards by one or more fans arranged alongside one another and has for its object to provide an arrangement for a better utilization of the space limited by the loading gauge and for a lessening of the length of the condenser. The invention consists in the mixing condenser reaching right up to the recooling device, the cooling water preferably entering the condenser in its upper part along the whole of its length.

In the accompanying drawings some embodiments of a condenser according to the invention are shown diagrammatically.

Figure 6:
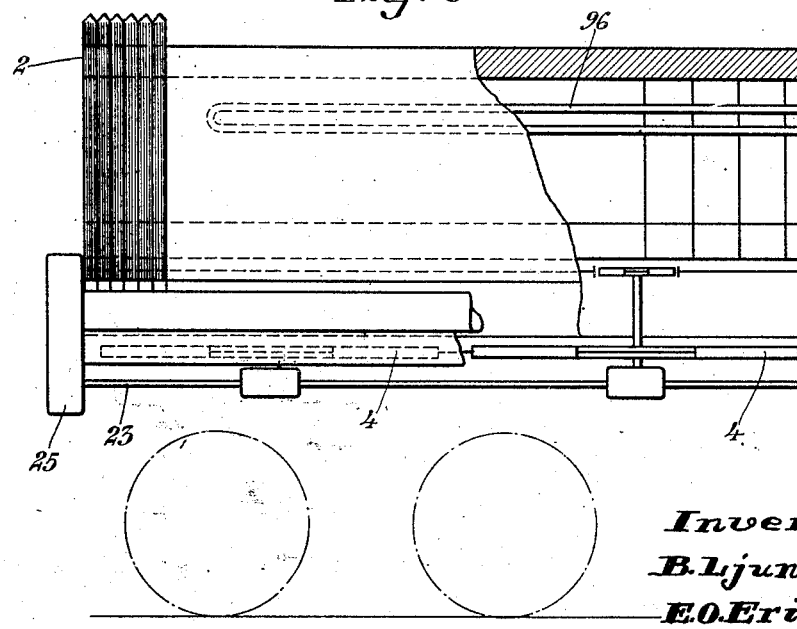

Fig. 1 shows a section through one embodiment. Fig. 2 shows a section through the upper part of the condenser on an enlarged scale. Figs. 3 and 3ᵃ are plan views of the upper part of the condenser, the recooling device being omitted showing different arrangements of the apertures. Fig. 4 shows a section on the line 4—4 in Fig. 1. Figs. 5, 6 and 7 show a cross section, a side view and a partial section on the line 7—7 in Fig. 5 respectively of another embodiment. Fig. 8 is a section through another embodiment of the condenser. Figs. 9 and 10 are a longitudinal plan section and a section on the line 10—10 in Fig. 9 respectively of a condenser according to the invention. Fig. 11 is a vertical longitudinal section through a somewhat modified embodiment. Fig. 12 is a horizontal section of another embodiment, Fig. 13 a section on the line 13—13 in Fig. 12 and Fig. 14 a section on the line 14—14 in Fig. 12. Figs. 15, 16 and 17 are a horizontal section, a section on the line 16—16 and a section on the line 17—17 in Fig. 15 respectively of a further embodiment. Fig. 18 is a longitudinal section through a cooling element together with its collecting chamber. Fig. 19 is a section on the line 19—19 in Fig. 18. Fig. 20 is a cross section through an element taken at right angles to Fig. 19 on an enlarged scale. Figs. 21, 22, 23 and 24 illustrate diagrammatically different ways of effecting the throttling of the elements.

Referring to Figs. 1-4, 1 signifies a mixing condenser, 2 and 3 a recooling device extending above and on either side of the condenser 1. Between said device 2, 3 and the condenser 1 two rows of fans 4, 5 are arranged which force the air from below upwards through the recooling device in the direction of the arrow 6. The fans operate in planes forming an angle to one another and are so placed that a spacious pressure chamber is formed between the fans and the recooling device 2, 3 and that the passage area of the fans becomes large in relation to the inlet opening. The fans are driven by a common shaft 7 by which also a rotary pump 8 is driven. Of course other driving means may be conceived. The rotary pump 8 operates in a diaphragm 10 extending along the whole length of the condenser, the diaphragm being situated below the water level and dividing the condenser in two parts, an upper and a lower part. The rotary pump or pumps 8 force the water from the upper to the lower part of the condenser from where it is forced up by the pressure through the pipes 11 and 12 into the distributing pipes 13 and 14 which are situated one on each side of the condenser and from which the water rises through the elements and is collected in the collecting chambers 15. Therefrom the water enters the upper part of the condenser which, in its full length, reaches right up to the top of the recooling device. The water sprinkles down into the condenser along its whole length on to an upper diaphragm 16 provided with apertures. By this diaphragm 16 the water is divided up into fine jets and flows down and condenses the waste steam present in or entering the receptacle and is then collected at the bottom of the condenser after having passed through a screen 17 for the filtering off of impurities, said screen extending along the whole length of the condenser. The cooling water together with the condensate is then caused to circulate through the recooling device.

As locomotives do not continuously deliver the same power to the driving wheels and the same quantity of steam to the condenser, the condenser should contain such a great quantity of water that the water in itself, on the temperature rising, is able to accumulate that amount of heat which the recooling device is not able to absorb during forced service. When the locomotive is delivering a small amount of power to the driving wheels and thus little or no steam to the condenser, the surplus heat stored up by the water during periods of heavy load may then be removed by forcing the cooling water through the condenser plant. By this means the condenser does not need to be built for maximum quantities of steam given off by the driving machineries but for a mean value which, of course, is followed by great advantages. The fans 4 and 5 and the rotary pumps 8 are in this case preferably arranged in such a way, that their rates of speed or their effectiveness respectively may be regulated independently of the waste steam coming from the driving machinery of the locomotive. For that reason the fans and the pumps are preferably driven by a special driving mechanism which may be controlled from the driver's cabin and which may be regulated in such a way that, on the rotary pump 8 carrying a lesser quantity of water due to its slower running, a lesser or no quantity of steam then being supplied to the condenser, the fans are also given a lesser rate of speed because a smaller quantity of water is then required.

In the condenser shown in Fig. 1, the different elements of the recooling device should therefore be constructed according to previously known principles in order to obtain good conditions for the flow. According to Fig. 2 the condenser 1 is for this purpose provided with a part 18 welded to it and provided with apertures 19 through which the water is conducted down from the recooling device into the receptacle, situated below said device, above the diaphragm 16 of the condenser. The apertures or the channels 19 in the welded-on part 18 are narrow, in order to lessen the losses of flow and pressure of the water. In these apertures the collecting pipes 15 are preferably inserted which thus communicate directly with the condenser. The apertures are arranged either as shown at 20 in Fig. 3, the apertures then being arranged by pairs in rows, or as shown at 21, in Fig. 3ª in which case the apertures are arranged in zigzag. In the first case the apertures 19 and the jets of water coming therethrough will thus meet in the lower portion of the welded-on part 18 at 22 while in the last case the jets of water will become entirely separated from each other. The water flows into the condenser in the shape of a broad, nearly continuous jet extending chiefly along the whole length of the condenser, the jet being divided by the diaphragm 16 into finer jets. The apertures may be replaced by slots extending along the whole length of the welded-on part 18 in order to enable the cooling water to enter continuously along the whole length of the condenser.

To facilitate the inflow of the air the pipes 11 and 12 are preferably given a flattened shape as shown in Fig. 4 the pipes when having this shape offering the smallest possible resistance against the air. From Fig. 4 it is also seen that the cooling water is pressed up from the lower part of the condenser through several pipes 12 situated on either side of the condenser, contrary to what has formerly been the case when the cooling water has been pumped up from the bottom of the condenser by means of a pump through a centrally running pipe.

In the embodiment shown in Figs. 5-7 the condenser 1 is pear-shaped and is placed above the fan or fans 4 which force the air through the air-cooled recooling device 2, 3 in the direction of the arrow 6. The two portions 2, 3 of the recooling device are each composed of one curved, preferably circular part and one straight part. The fans 4 are arranged only in one row, as shown in Fig. 6, and are placed entirely below the condenser 1 and preferably mounted on it, the driving shaft 23 being situated below the fans 4. The driving shaft 23 may of course also be situated between the fans 4 and the condenser 1. The circulating pump 8 operating in the diaphragm 10 is preferably driven by the shaft 24 from the same shaft 23 by which the fans 4 are driven, the pump 8 and one of the fans 4 being preferably mounted on the shaft 24. The shaft 23 and consequently also the fans and the pumps are driven by a special driving motor 25, which, if it consists of a steam turbine with toothed gearing as has previously been suggested, admits the waste steam into this end of the condenser. Furthermore, the condenser 1 is built as a mixing condenser in the manner previously described. The water enters the upper part of the condenser at 26 and flows down on to the perforated diaphragm 16 through which the water sprinkles down in a finely divided state and is collected at the bottom of the condenser. In a previously known manner the circulating pump 8 presses the water down below the diaphragm 10 below which the water is under pressure as compared to the rest of the water in the condenser and is pressed into the inlet pipes 11 and 12 in the direction of the arrows. The waste steam from the machinery of the locomotive is let in either at one or both ends of the condenser, the last-mentioned instance being shown in Fig. 7 where the steam enters at 27 and 28 and passes onwards to the air pump connection 29 situated in the middle of the condenser. In order to cause a mixing of the steam and to make it travel a longer course through the sprinkling water the condenser is divided by means of screens 30 along the whole of its length as shown in Fig. 7. The steam passes around these screens and is condensed, and there ought not to be any steam round the connection 29 but only the small quantity of air always present in condensers, which air is sucked out by means of an ejector 31. In this case the elements of the air-cooled device 2, 3 are preferably so arranged in relation to the cooling air flowing through that the coldest cooling water enters that part of the condenser in which the air pump connection is situated. The outlet of the ejector 31 is connected to a surface condenser 32, shown in Fig. 5 in the upper part of the condenser, said surface condenser being situated in the coldest water which flows down directly from the recooling device. The condenser 32 may preferably consist of a single pipe-coil extending along a part or the whole of the condenser above the diaphragm 16.

In this embodiment the condenser is so shaped that the passage for the cooling air decreases in size in the flowing direction of the air. By this means it will be guaranteed that the same quantity of air passes through all portions of the recooling device and that the air flowing through encounters as small a resistance as possible.

The partitions or screens 30 form an angle with the longitudinal direction of the condenser, whereby an angularly extending channel through the condenser is formed, and consequently the way of the steam through the condenser to the air pump connection 29 becomes longer. If equally large quantities of steam are introduced in both ends of the condenser, the air pump connection 29 is preferably arranged in the middle of the condenser 1, but if for instance a larger quantity of steam is introduced through the inlet 27 than through the inlet 28, the connection for the air pump is arranged at a greater distance from the inlet 27 than from the inlet 28 corresponding to the entering quantities of steam in such a way, that steam from both ends is entirely or to the same degree condensed at the air pump connection. By causing the steam to pass a longer way in the condenser, the steam can be better utilized and of the water flowing down through the condenser a better use can be made for condensing purposes. According to the invention it is consequently guaranteed that all steam is condensed at the air pump connection 29, which on the contrary would not be the case in case of the condenser being not provided with screens, because then on forced service recently incoming steam might flow directly to the air pump connection 29 and thus be immediately sucked out by the pump.

In the embodiment shown in Fig. 8 the cooling water is pumped up from the cylindrical condenser 1 by a centrifugal pump 33 into the upper collecting chambers 15 of the air-cooled part 2, 3 into which chambers the water is distributed by the distributing pipe 34. The cooling water flows through the air-cooled recooling device chiefly in the direction from above and downwards to the collecting pipes 35, 36 from which the water is returned to the condenser 1 above the diaphragm 39 through the return pipes 37, 38 in the direction of the arrow. In the condenser the water sprinkles down in known manner in a finely divided state whilst condensing the steam. The air necessary for cooling the water is forced on by the fan or a row of fans 4 respectively, arranged between the condenser 1 and the air-cooled device 2, 3.

In the condenser 1 for a condenser according to the invention as shown in Figs. 9 and 10, circular in cross section, the partitions or screens 30 are so arranged, that said condenser is divided in channels in such a way that the entering steam may take two ways. The air pump connection 29 is arranged in the middle of the condenser between the two steam inlets 27 and 28. The screens 30 extend right down to the bottom of the condenser and are provided with apertures 39¹ at the foot for the passage of the water.

In the embodiment shown in Fig. 11 the screens 30 only extend down to the diaphragm 40 in which the circulating pump (not shown) operates.

In the embodiment shown in Figs. 12, 13 and 14 the screens 30 are bent angularly in order to provide a channel for the steam extending from the single inlet 41 of the condenser to the air pump connection 42, the steam passing in the direction of the arrow. It is not necessary that the screens 30 extend right down to the bottom of the condenser, but preferably they should extend below the water level 43.

In the embodiment shown in Figs. 15, 16 and 17, the partitions 30 are provided with shelves, or other screens 44 eventually arranged obliquely in order to give the water a longer way through the condenser. Said shelves or screens may be horizontal or they may be slanting in different ways, and may cover each other entirely or project in one another. The shelves may be of different sizes and a lower shelf may be wider than an upper one etc.

The elements of the air-cooled device have preferably the shape shown in Figs. 18, 19 and 20. The elements 46, which four in number are inserted in the square collecting pipe 47, consist of flattened pipes provided with ribs 48 projecting at both sides in order to increase the cooling surface.

In order to be sure that the steam has time enough to be entirely condensed during its passage through the condenser the air-cooled device is, as stated above, preferably arranged in such a way that colder water flows down at those places which lie opposite the air pump connection than at other places in the condenser. This may be attained by forcing a greater quantity of air in relation to the water flowing down around the elements of the air-cooled device, that deliver water at or close by the connection of the pump, by making the distance between the elements greater at those places than in the other portions of the air-cooled device as shown in Fig. 7. Colder water at said places may also be obtained by so throttling the corresponding element that the water passes slower through said elements and consequently is cooled to a lower temperature. Said throttling may in known manner be effected for instance as shown in Fig. 21, by decreasing continuously the height $h$ at the inlet end of such an element consisting of a flattened pipe to $h^1$ at the outlet end, whereby the outlet section becomes smaller than the inlet section, or as shown in Fig. 22 by decreasing continuously in the same manner the width $b$ of the element from its inlet to its outlet end, or as shown in Fig. 18 by inserting a throttling plate 49 in the lower part of the collecting pipe 47, or as shown at 50 by throttling the outlet of the pipe 47. In the latter case, consequently, all the elements inserted in the collecting pipe are throttled. One element may also be throttled independently of the other elements by flattening the element as shown in Fig. 23 in such a way that the cross section of the element alters from the lines drawn in full to the dotted lines, or as shown in Fig. 24 by placing a plate provided with narrow slots or apertures in front of the openings of the elements. By increasing step by step the distance between the elements or the throttling of the same respectively towards the connection 18, the water is given a gradient temperature, which is rather advantageous, because the steam thereby meets colder and colder water while passing through the condenser. Of course, said measures to increase the condensing capacity of the condenser must not be taken at the cost of the length of the condenser.

Several embodiments may be conceived without departing from the principles of the invention. For instance the invention is independent of the shape of the fans and the pumps or their positions. The abovementioned circulating pumps in the condenser may thus be replaced by pumps of any other kind and further the elements of the recooling device may have any other form than shown in the drawings, for instance they may be straight or composed of several parts.

What we claim as new and desire to secure by Letters Patent of the United States of America is:—

1. A condenser plant for locomotives and similar vehicles, comprising a mixing condenser of an elongated shape arranged longitudinally of the locomotive and adapted to contain cooling water, a re-cooling device, said mixing condenser reaching right up to said re-cooling device, means for moving the cooling water from said condenser through said re-cooling device and back to said condenser, and a fan for moving air necessary for cooling through said re-cooling device.

2. A condenser plant for locomotives and similar vehicles, comprising a mixing condenser of an elongated shape arranged longitudinally of the locomotive and adapted to contain cooling water, a re-cooling device, said mixing condenser reaching right up to said re-cooling device, means for moving the cooling water from said condenser through said re-cooling device, means to return the cooling water into the condenser continuously along the whole length thereof, and a fan for moving air necessary for cooling through said re-cooling device.

3. A condenser plant for locomotives and similar vehicles, comprising a mixing condenser of an elongated shape arranged longitudinally of the locomotive and adapted to contain cooling water, a re-cooling device, said mixing condenser reaching right up to said re-cooling device, a pipe on each side of said condenser connecting the lower end of the re-cooling device with the lower part of the condenser, a pump for moving the cooling water from said condenser through said pipes and said re-cooling device and back to said condenser, and a fan for moving air necessary for cooling through said re-cooling device.

4. A condenser plant for locomotives and similar vehicles, comprising a mixing condenser of an elongated shape arranged longitudinally of the locomotive and adapted to contain cooling water, a re-cooling device consisting of flattened pipes extending on opposite sides of said condenser, said mixing condenser reaching right up to said re-cooling device, means for moving the cooling water from said condenser through said re-cooling device and back to said condenser, a fan for moving air necessary for cooling between said pipes of the re-cooling device and means for uniformly distributing said air to the re-cooling device.

5. A condenser plant for locomotives and similar vehicles, comprising a mixing condenser of an elongated shape arranged longitudinally of the locomotives and adapted to contain cooling water, a re-cooling device, said mixing condenser reaching right up to said re-cooling device, means for moving cooling water from said condenser through said re-cooling device and back to said condenser, a pump connected to said condenser for sucking out air from the condenser plant, a surface condenser arranged in the upper part of said condenser and connected to the outlet of said pump, and a fan for moving air necessary for cooling through said re-cooling device.

6. A condenser plant for locomotives and similar vehicles, comprising a mixing condenser of an elongated shape arranged longitudinally of the locomotive and adapted to contain cooling water, a re-cooling device, partitions in said condenser dividing said condenser into compartments forming together a zigzag channel, means for moving the cooling water from said condenser through said re-cooling device and back to said condenser, and a fan for moving air necessary for cooling through said re-cooling device.

7. A condenser plant for locomotives and similar vehicles, comprising a mixing condenser of an elongated shape arranged longitudinally of the locomotive and adapted to contain cooling water, a re-cooling device, said mixing condenser reaching right up to said re-cooling device, means for moving cooling water from said condenser through said re-cooling device and back to said condenser, a pump connected to said condenser for sucking out air from the condenser plant, a surface condenser arranged in the upper part of said condenser and connected to the outlet of said pump, and a fan for moving air necessary for cooling through said re-cooling device, the pipes of said re-cooling device being so arranged in relation to the cooling air flowing therethrough that the coldest cooling water enters the part of the receptacle, where the air pump connection is arranged.

8. A condenser plant for locomotives and similar vehicles, comprising a mixing condenser of an elongated shape arranged longitudinally of the locomotive and adapted to contain cooling water, a re-cooling device consisting of flattened pipes, said mixing condenser reaching right up to said re-cooling device, means for moving cooling water from said condenser through said re-cooling device and back to said condenser, a pump connected to said condenser for sucking out air from the condenser plant, a surface condenser arranged in the upper part of said condenser and connected to the outlet of said pump, and a fan for moving air necessary for cooling through said re-cooling device, the distances between the pipes of the re-cooling device, which deliver cooling water substantially at the pump connection, being greater than those between the other pipes of said re-cooling device.

In testimony whereof we affix our signatures.

BIRGER LJUNGSTRÖM.
ERIK OTTO ERIKSSON.
FREDRIK LJUNGSTRÖM.